United States Patent
Sparbert et al.

(10) Patent No.: US 10,222,459 B2
(45) Date of Patent: Mar. 5, 2019

(54) METHOD FOR CONTROLLING A MICRO-MIRROR SCANNER, AND MICRO-MIRROR SCANNER

(71) Applicant: Robert Bosch GmbH, Stuttgart (DE)

(72) Inventors: Jan Sparbert, Rutesheim (DE); Frank Fischer, Gomaringen (DE); Frank Schatz, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 475 days.

(21) Appl. No.: 14/917,848

(22) PCT Filed: Aug. 14, 2014

(86) PCT No.: PCT/EP2014/067394
§ 371 (c)(1),
(2) Date: Mar. 9, 2016

(87) PCT Pub. No.: WO2015/043825
PCT Pub. Date: Apr. 2, 2015

(65) Prior Publication Data
US 2016/0223654 A1     Aug. 4, 2016

(30) Foreign Application Priority Data
Sep. 27, 2013   (DE) .................. 10 2013 219 567

(51) Int. Cl.
*G01C 3/08*     (2006.01)
*G01S 7/481*    (2006.01)
(Continued)

(52) U.S. Cl.
CPC .......... *G01S 7/4817* (2013.01); *G01S 7/4802* (2013.01); *G01S 17/89* (2013.01)

(58) Field of Classification Search
CPC ....... G01S 17/89; G01S 7/4802; G01S 7/4817
(Continued)

(56) References Cited

U.S. PATENT DOCUMENTS 5,638,164 A   6/1997   Landau
6,304,321 B1  10/2001  Wangler et al.
(Continued)

FOREIGN PATENT DOCUMENTS

CN   102159982 A   8/2011
DE   10143060      3/2003
(Continued)

OTHER PUBLICATIONS

International Search Report for PCT/EP2014/067394, dated Nov. 19, 2014.

*Primary Examiner* — Mark Hellner
(74) *Attorney, Agent, or Firm* — Norton Rose Fulbright US LLP; Gerard Messina

(57) ABSTRACT

A micromirror scanner and a method for controlling a micromirror scanner. The method includes furnishing a shot pattern which has at least information regarding first control application signals as a function of mirror positions of a displaceable micromechanical mirror of the micromirror scanner, which are designated to control a light source of the scanner; determining a mirror position of the mirror; emitting light beams into a solid angle; measuring light beams reflected at an object in the solid angle to determine a distance between the object and the scanner; determining a nature or position of the object with respect to the scanner as a function of the determined distance and the determined current mirror position; and adapting the shot pattern as a function of the position and/or nature of the object.

14 Claims, 7 Drawing Sheets

(51) Int. Cl.
*G01S 17/89* (2006.01)
*G01S 7/48* (2006.01)

(58) Field of Classification Search
USPC .......................................................... 356/4.01
See application file for complete search history.

(56) References Cited

U.S. PATENT DOCUMENTS

| | | |
|---|---|---|
| 8,203,702 B1 | 6/2012 | Kane et al. |
| 9,383,753 B1 * | 7/2016 | Templeton ........... G05D 1/0246 |
| 2004/0074296 A1 | 4/2004 | Perry |
| 2004/0213463 A1 | 10/2004 | Morrison |
| 2013/0207970 A1 * | 8/2013 | Shpunt .................... G06T 15/00 |
| | | 345/419 |

FOREIGN PATENT DOCUMENTS

| | | |
|---|---|---|
| DE | 102008055159 | 7/2010 |
| DE | 102009000008 | 7/2010 |
| DE | 102009055988 | 3/2011 |
| DE | 102010061382 | 6/2012 |

\* cited by examiner

METHOD FOR CONTROLLING A MICRO-MIRROR SCANNER, AND MICRO-MIRROR SCANNER

FIELD

The present invention relates to a method for controlling a micromirror scanner, and to an adaptive micromirror scanner. The present invention relates, in particular, to a method for adaptively controlling a micromirror scanner in a vehicle, and to an adaptive micromirror scanner in a vehicle.

BACKGROUND INFORMATION

Modern driver assistance systems often use sensor equipment that can accurately sense objects in all three spatial dimensions. Numerous downstream functions are based thereon, for example a distance-sensing cruise control system, a parking aid, a lane-keeping assistant, a traffic sign recognition system, a lane departure warning system, and others. Light-based, in particular laser-based, sensor suites, called "laser scanners" or "lidar" or "ladar," are well suited for such tasks.

Particularly robust and inexpensive micromirrors, i.e., micromechanical mirrors, are advantageously used for this. Light scanners or laser scanners having such micromechanical mirrors are also called "micromirror scanners" or "micromirror laser scanners." Technical challenges are presented by the limited thermal tolerance of the light sources that are used (for example laser diodes, LEDs). The number of image points in one scanning operation, or per unit time, is thereby limited. In conventional systems, the angular resolution can correspondingly turn out to be comparatively low.

U.S. Pat. No. 5,638,164 describes a method for controlling a laser scanner in which a scene is scanned with laser beams.

The laser beams are emitted according to a regular grid of points, and the reflectivity of objects that the light beams strike is determined. If a region is classified as "of interest" according to reflectivity, the grid spacing of the regular point grid can be reduced in order to investigate the region "of interest" in more detail.

SUMMARY

The present invention relates to a method for controlling a micromirror scanner, and a micromirror scanner.

In accordance with the present invention, by controlling a light source, for example a laser source, properties of the emitted light beams can be modified in targeted and versatile fashion, with the result that the efficiency and functional capability of micromirror scanners can be appreciably enhanced. In particular, a high effective resolution of a region to be scanned is possible, with minimal thermal load on the light source. Essential functional requirements can thereby be met.

The example micromirror scanner according to the present invention is robust and at the same time inexpensive. It allows the number of image points (which is limited, for example, by thermal load) to be used in such a way that a higher scan resolution is effectively possible in solid angle regions that are of interest for desired functions ("regions of interest," ROI). The number of image points can, however, deliberately be kept small in order to reduce in timely fashion the data volume that occurs, and thus to reduce a processing outlay and costs therefor. Properties of the light beams, and thus also of the image points projected by them, can thus be modified during the run time of the system in terms of emission direction, resolution, range, and image rate, so that an image of the environment optimized for desired functions can be captured.

Control of the light source (or laser source) allows a precise budget for the waste heat resulting in the context of scanning. For example, if a first solid angle region is surveyed in more detail, i.e., if more light beams are sent thereinto per unit time and/or per steradian, then simultaneously fewer light beams are sent out per unit time and/or per steradian in a second solid angle region, so that the average heat generated per unit time remains substantially the same. An elevated thermal load on the micromirror apparatus for a longer time can also be deliberately accepted, and is then followed by an off-time interval for cooling. For example, a temperature measurement device can be provided for this purpose on and/or in the micromirror scanner.

The adaptation of the shot pattern can follow simple rules, but can also be controlled in very complex fashion by way of situational and functional properties, e.g., using an object tracking algorithm or a situational analysis. Closed control loops of the sensor equipment and functions can, in particular, also be implemented.

According to a preferred refinement of the example method according to the present invention, control is applied to the displaceable micromechanical mirror using second control application signals, in such a way that the displaceable micromechanical mirror cyclically travels through a determined sequence of mirror positions. Determination of the current mirror position of the displaceable micromechanical mirror can then be accomplished based on the second control application signals. A separate mirror position determining device, for example having dedicated electromechanical elements, can thus be avoided; this can decrease complexity and costs.

According to a further preferred refinement the determined sequence of mirror positions through which the displaceable micromechanical mirror cyclically travels is adaptable during operation as a function of first signals of external sensors and/or as a function of a first input of a user. "External sensors" are those sensors which are not integrated into the micromirror sensor. For example, a solid angle region in which an object of particular interest has been identified can be scanned particularly finely by the fact that the mirror travels only through those mirror settings which result in the deflection of light beams for scanning that solid angle region. A regionally varied scan rate can be achieved by way of the repetition rate, i.e., the time sequence with which control is applied to a determined solid angle region.

According to a further preferred refinement, the shot pattern is adaptable during operation of the micromirror scanner as a function of second signals of external sensors and/or as a function of a second input of a user. For example, the shot pattern can be adapted as a function of a weather situation, for example dense fog, in order to optimize scanning.

According to a further preferred refinement, the shot pattern is adapted in such a way that a first plurality of the light beams is generated as a function of first mirror positions that are traveled through successively in continuously connected fashion. The light beams of the first plurality are separated from one another in time by first, respectively identical time intervals. A shot pattern of this kind can be used, for example, at the beginning of the method or as a standard shot pattern, in order to create a first scan image of the environment on the basis of which more detailed adaptations can then be performed.

According to a further preferred refinement, the shot pattern is adapted in such a way that a second plurality of the light beams is generated as a function of second mirror positions that are traveled through successively in continuously connected fashion. The light beams of the second plurality are separated from one another in time by second, respectively identical time intervals, the second time intervals being shorter or longer than the first time intervals. A more detailed or less detailed scan of a solid angle region can thus be accomplished in simple fashion, with no need to modify the motion of the micromechanical mirror, by the fact that more or fewer light beams are sent out for scanning in that solid angle region than in another.

According to a further preferred refinement, the shot pattern is adapted in such a way that a third plurality of the light beams is generated as a function of third mirror positions that are traveled through successively in continuously connected fashion. The light beams of the third plurality of the light beams are generated with a wider or narrower beam shape than the light beams of the first plurality of the light beams. Wider beam shapes can allow the proportion of the solid angle scanned to be increased, simultaneously with a lower thermal load on the micromirror scanner. Narrower beam shapes, conversely, can enable more precise scanning.

According to a further preferred refinement, the shot pattern is adapted in such a way that a fourth plurality of the light beams is generated as a function of fourth mirror positions that are traveled through successively in continuously connected fashion. The light beams of the fourth plurality of the light beams are generated with a higher or a lower radiation power level than the light beams of the first plurality of the light beams. The effective range of the light beams can thus be adjusted as necessary, for example as a function of third signals of external sensors. If very close objects are to be surveyed, i.e., scanned, for example, then light beams having a lower radiation power level can be generated, for example, in order to save energy and decrease the thermal load on the micromirror scanner.

BRIEF DESCRIPTION OF THE DRAWINGS

The present invention is explained below in further detail with reference to the exemplifying embodiments depicted in the schematic Figures.

In all the Figures, identical or functionally identical elements and apparatuses are labeled with the same reference characters unless otherwise indicated.

DETAILED DESCRIPTION OF EXAMPLE EMBODIMENTS

Figure 1:
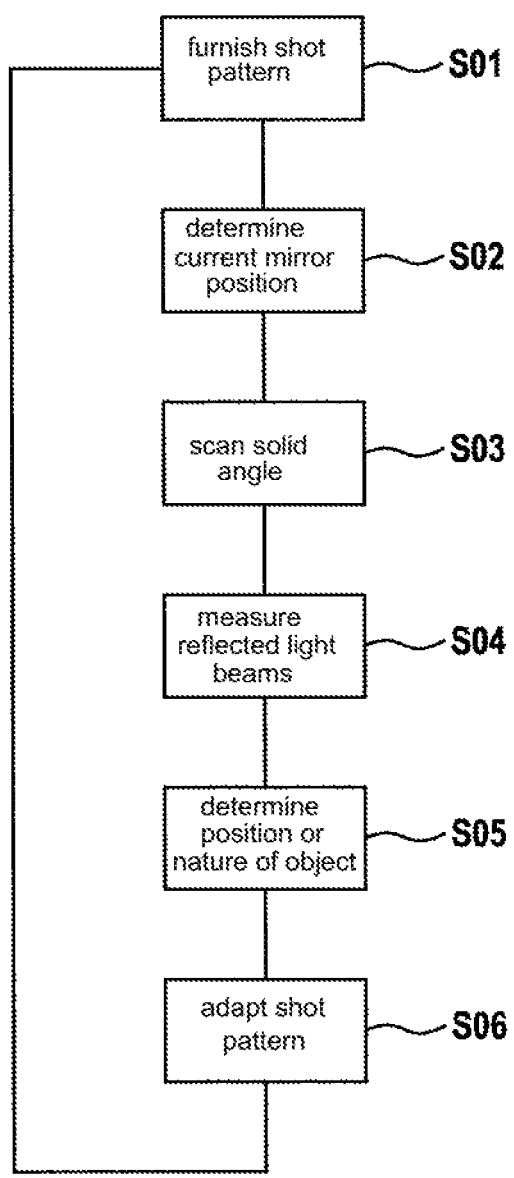
FIG. 1 is a schematic flow chart to explain a method according to the present invention for controlling a micromirror scanner.

FIG. 1 is a schematic flow chart to explain a method according to the present invention for controlling a micromirror scanner. The numbering of the method steps is not necessarily intended to signify that the steps are to occur in a determined sequence; in particular, multiple method steps can also be carried out simultaneously.

In a first method step (S01) a shot pattern 13 is furnished. Shot pattern 13 encompasses at least information regarding first control application signals for applying control to a light source 10 of the micromirror scanner.

Shot pattern 13 can also encompass information regarding second control application signals that are designated for application of control to a displaceable micromechanical mirror 14 of the micromirror scanner. The first control application signals for applying control to light source 10 are, in accordance with shot pattern 13, dependent on mirror positions of mirror 14.

In a further method step S02 a current mirror position of micromechanical mirror 14 is determined. This can be done, for example, by evaluating the second control application signals according to which control is currently being applied to micromechanical mirror 14. It is possible to ascertain therefrom how micromechanical mirror 14 is currently oriented, i.e., the current mirror position in which it is located.

Alternatively thereto, a mirror position determining device 15 can be embodied to determine S02 the current mirror position of micromechanical mirror 14. For this, for example, inductive and/or capacitive measuring elements of mirror position determining device 15 can be embodied on or at micromirror 14 and can be evaluated by mirror position determining device 15. Mirror position determining device 15 can advantageously be used to determine discrepancies between a desired current mirror position and an actual current mirror position of micromechanical mirror 14, with the result that an accuracy of the micromirror scanner can be enhanced.

In a method step S03 a solid angle is scanned, i.e., light beams 20 are emitted into the solid angle. For this, light beams 20 are generated by way of light source 10 (see also FIGS. 2 and 3) as a function of the determined current mirror position of micromechanical mirror 14, in accordance with the first control application signals of shot pattern 13. For emission S03 of light beams 20 into the solid angle, light beams 20 are deflected by way of micromechanical mirror 14 which is in the determined current mirror position. The micromirror scanner thus has available to it information as to that solid angle into which light beams 20 were emitted, at what point in time, and with what properties. The properties of light beams 20 can encompass a beam width, a radiation power level, etc.

A transformation specification can be predetermined, according to which the mirror positions of micromechanical mirror 14 can be converted into solid angles in terms of the micromirror scanner. This can be advantageous, for example, if further optical devices 32 are embodied in the beam path of light beams 20 between micromechanical mirror 14 and the solid angle.

When light beams 20 encounter an object 30 in the solid angle (see FIG. 2), the deflected light beams 20 can be specularly or diffusely reflected back to the micromirror scanner. In a further method step S04, light beams 22 reflected in this manner are measured by way of a light sensor 16 of the micromirror scanner. A distance between object 30 and the micromirror scanner can be determined, for example, by way of a computation device 17 (see FIG. 4). For this, in particular, a time offset Δt between a point in time of generation of light beams 20 and a point in time of the measurement S04 of light beams 22 reflected at object 30 in the solid angle can be determined. The distance between object 30 and the micromirror scanner can thus be calculated using information regarding the beam path of light beams 20, 22 within the micromirror scanner, and the speed of light.

In a further method step S05 a position of object 30 with respect to the micromirror scanner and/or a nature of object 30 is determined at least as a function of the determined distance and the determined current mirror position of mirror 14. A radiation power level difference of the measured light beams 22 with respect to the generated light beams 20 can also be identified, for example, based on which a surface finish of object 30 can be inferred. If the radiation power level difference is very small, for example, a reflective (e.g., metallic) surface can be inferred. If, for example, a vehicle is equipped with the micromirror scanner, it can be concluded that object 30 having the metallic surface could be a further vehicle. A database 18 having predetermined identification characteristics can be provided for the purpose of determining S05 the nature of object 30. The above-described indications for identifying a vehicle can be contained in database 18.

In a method step S06, shot pattern 13 is adapted as a function at least of the determined position and/or of the determined nature of object 30. This can be accomplished, for example, by a shot pattern adaptation device 3 (see FIG. 4). In order to control shot pattern adaptation device 3, computation device 17, which can be present in the form of an electronic evaluation system but also in the form of software, can perform an evaluation of the determined (S05) position and/or nature of object 30. This can contain different processing levels for object detection, for object tracking, for object identification, and/or for situation analysis. The results of the evaluation can be passed on to downstream functions 19 (see FIG. 4). Shot pattern adaptation device 3 not only can adapt shot pattern 13 as a function of the determined position and/or nature of object 30 but also can take into consideration in that context the further results, just described, of computation device 17. Data that are ascertained by external sensors 2 (see FIG. 4), or other furnished information, can furthermore influence the adaptation S06 of shot pattern 13.

For example, information regarding a speed of the vehicle equipped with the micromirror sensor could be used, at higher speeds, to scan a solid angle region in the travel direction in front of the vehicle at a higher image resolution than solid angles alongside the vehicle. A "higher image resolution" means, for example, that in the solid angle region in front of the vehicle, more solid angles per steradian are scanned than in the solid angle regions alongside the vehicle.

A motion of the micromirror scanner, for example a pitch, yaw, and/or roll but also a swing, precession, or warp, can also be sensed, for example, by way of external sensors 2. Undesired motions can be corrected in the context of the adaptation S06 of shot pattern 13.

It is also possible to survey in detail objects 30 whose position and/or nature has been determined S05, for example by the fact that a higher scan rate, i.e., image resolution, is brought about in the vicinity of an expected object edge of object 30 by way of an adapted shot pattern 13. It is also possible, for example in emergency braking situations of the vehicle, to increase the scan rate with the micromirror scanner and to perform detailed surveying of a potentially colliding object 30 with the highest priority. Measures to decrease the thermal load on light source 10 and/or on mirror 14 can also be disabled in this context.

Figure 2:
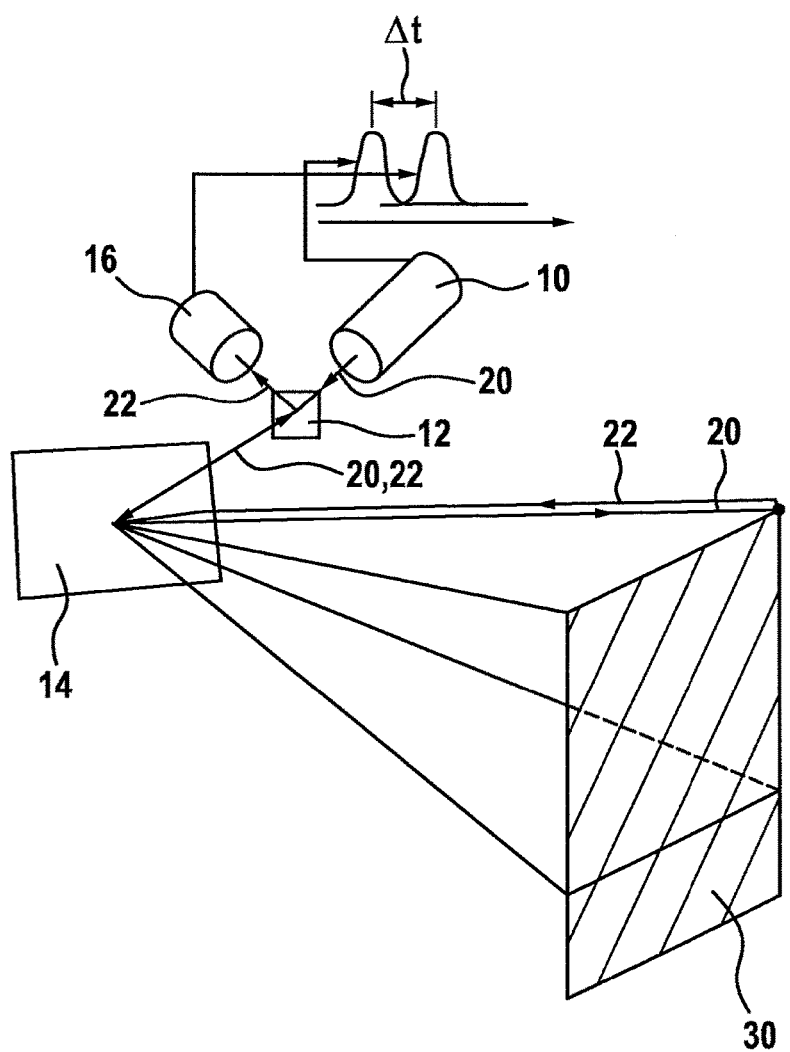
FIG. 2 is a schematic view of a micromirror scanner according to a first embodiment of the present invention.

FIG. 2 is a schematic view of a micromirror scanner according to a first embodiment of the present invention.

According to FIG. 2, both light beams 20 generated by light source 10 and light beams 22 to be measured are directed via an optional beam splitter 12. Micromechanical mirror 14 is suspended in gimbal-mounted fashion on two axes. Alternatively, however, numerous further control application and activation measures, and corresponding embodiments of micromechanical mirrors 14, are usable.

Figure 3:
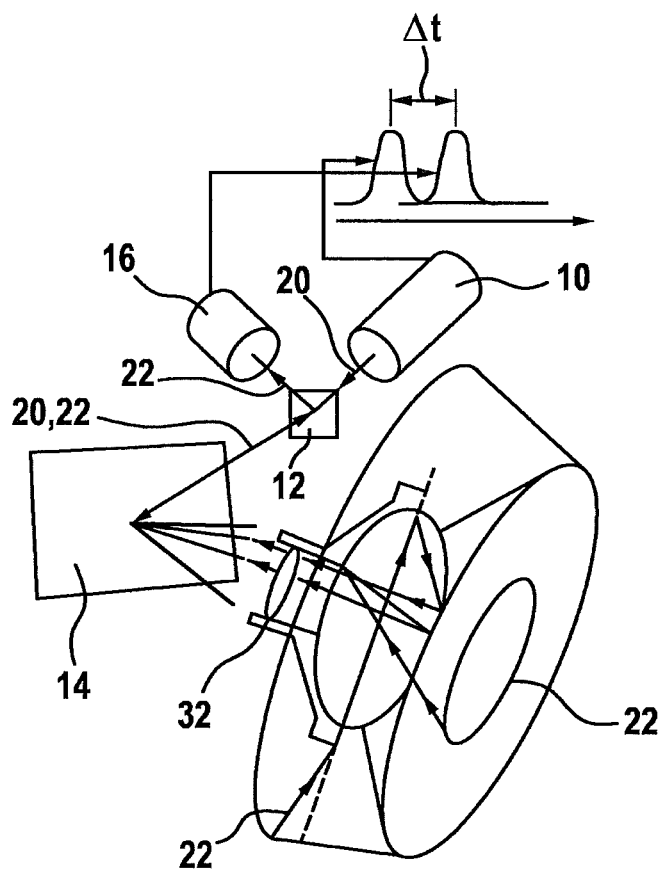
FIG. 3 is a schematic view of a micromirror scanner according to a second embodiment of the present invention.

FIG. 3 is a schematic view of a micromirror scanner according to a second embodiment of the present invention.

According to FIG. 3, the micromirror scanner has an optical device 32 that is traversed by light beams 20, 22. Optical device 32 has an omnidirectional lens 32. The optical axis of omnidirectional lens 32 is disposed orthogonally to the axes of the mirror. By way of omnidirectional lens 32, light beams 20 can scan the solid angle within a large solid angle region with a particularly large acceptance angle. An assemblage of this kind is advantageous in particular for scanning in a near region around the micromirror scanner.

Figure 4:
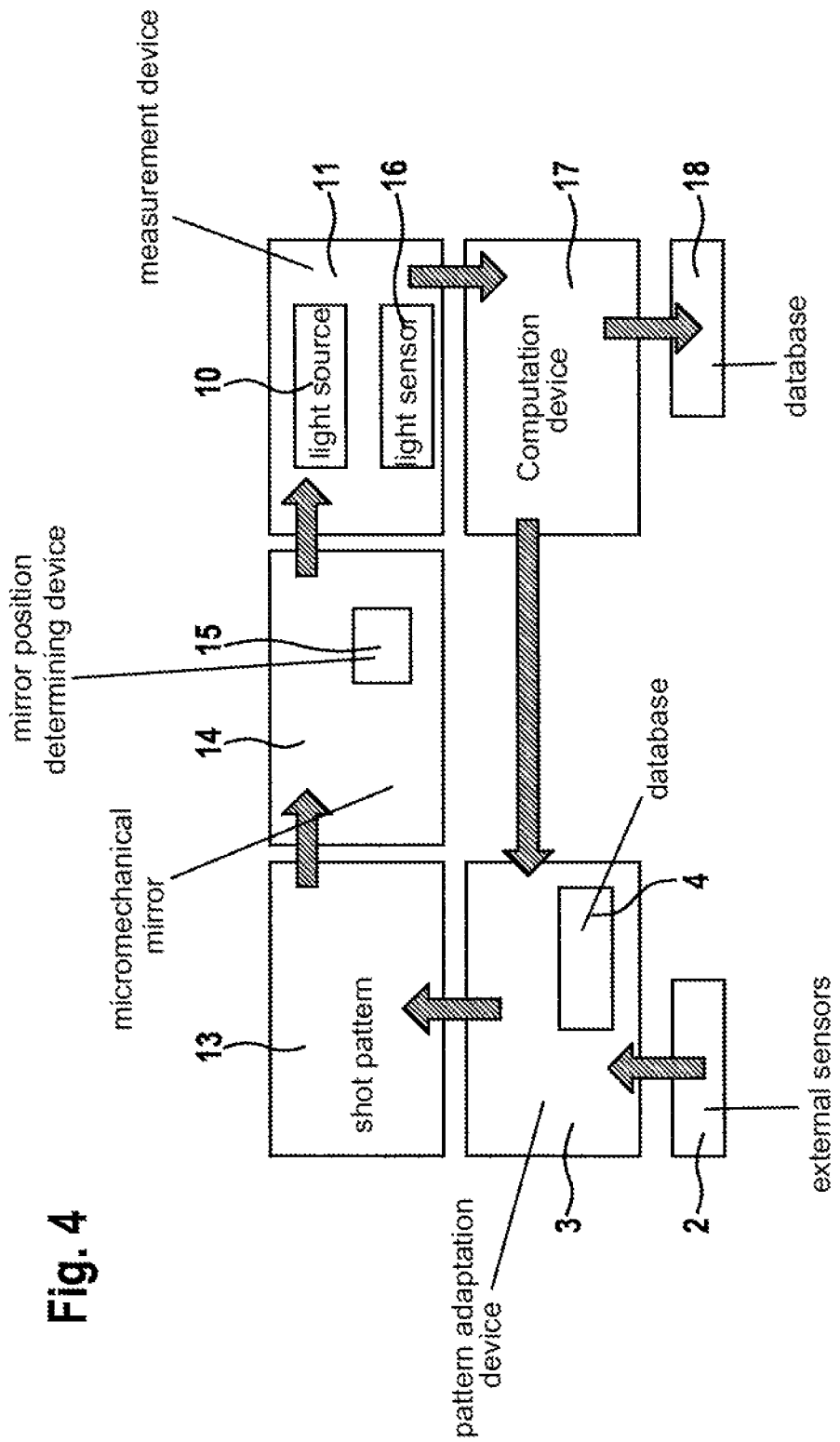
FIG. 4 is a schematic block diagram that illustrates a possible interaction of components of a micromirror scanner according to the present invention.

FIG. 4 is a schematic block diagram that illustrates a possible interaction of components of a micromirror scanner according to the present invention.

According to FIG. 4, shot pattern adaptation device 3 has a database 4 having pre-stored shot pattern sequences of shot patterns 13. Light source 10 is part of measurement device 11, which besides light source 10 also has light sensor 16. The light sensor can be, for example, an avalanche photodiode (APD) or another receiver. Measurement device 11 can furthermore encompass optical device 32, for example a lens assemblage.

Figure 5A:
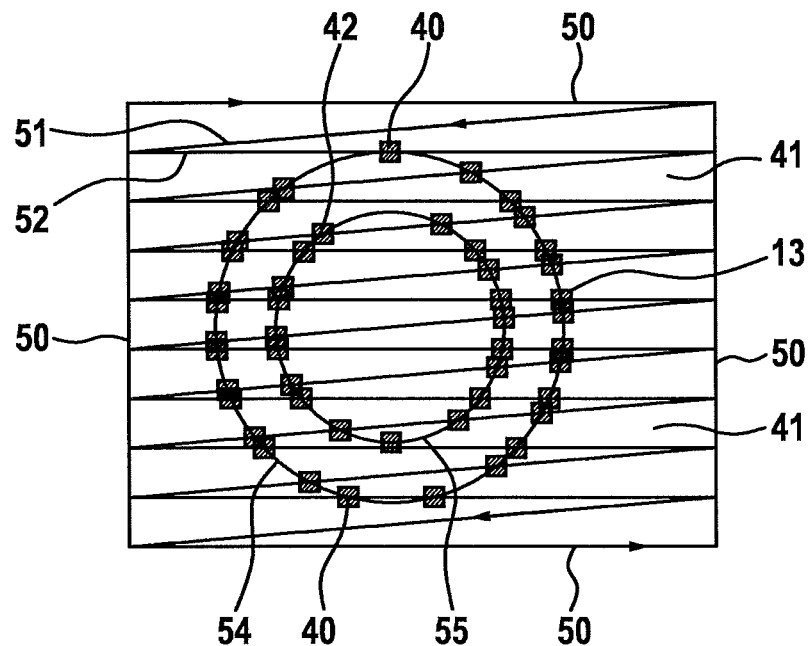
FIG. 5A schematically shows an exemplifying shot pattern that is usable in the method according to the present invention for controlling a micromirror scanner.

FIG. 5A schematically shows an exemplifying shot pattern that is usable in the method according to the present invention for controlling a micromirror scanner.

According to FIG. 5A, a solid angle region 50 into which micromechanical mirror 14 can deflect light beams 20 is projected by way of example onto a rectangular shape. Shot pattern 13 is correspondingly likewise of rectangular configuration. Each possible mirror position of micromechanical mirror 14 thus has associated with it a point or a region, for example a pixel, of shot pattern 13. According to FIG. 5A it is assumed, for example, that micromirror 14 cyclically travels through the mirror positions in zigzag fashion in accordance with respectively mutually parallel lines 51 and respectively parallel lines 52 in the shot pattern. In the interest of clarity, lines 51, 52 are depicted schematically in FIG. 5A with larger spacings.

Shot pattern 13 depicted in FIG. 5A is realized, as a particularly simple example, as a black and white image. At a mirror position of micromechanical mirror 14 whose associated region of shot pattern 13 shows a white area 41, no light beams 20 are generated by light source 10. An off time for the light source thus results. Light beams 20 are generated only for those mirror positions whose associated regions, for example pixels, of shot pattern 13 are black areas 40, 42 in the image. According to FIG. 5A, black areas 40, 42 are disposed along two notional concentric circles 54, 55. The closer together the black areas are located in shot pattern 13, the higher the scan rate in a corresponding solid angle region.

Figure 5B:
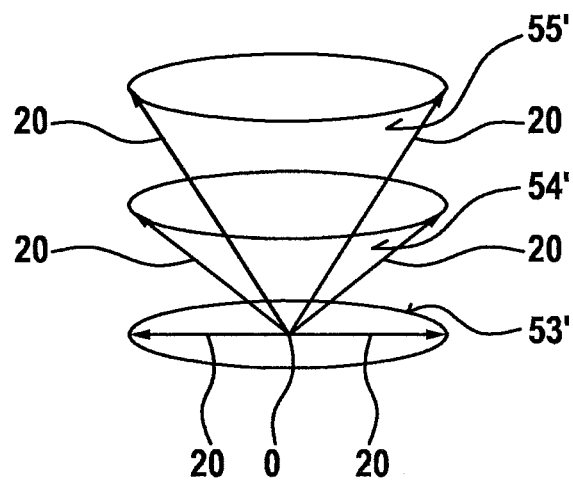
FIG. 5B schematically shows conical shells along which the light beams can be emitted in accordance with the shot pattern in order to scan the solid angle.

FIG. 5B schematically shows conical shells along which light beams 20 can be emitted in accordance with shot pattern 13 in order to scan the solid angle.

For the case in which, as shown in FIG. 3 with regard to the second embodiment of the present invention, an omnidirectional optic is embodied in or on the micromirror scanner, circular structures 54, 55 in shot pattern 13 can produce, after passage through omnidirectional optic 32, a sensing scan on conical enveloping surfaces 53', 54', 55'. Different circle radii of circular elements 54, 55 of shot pattern 13 result in conical enveloping surfaces 54', 55' having a different slope at conical vertex O, at which the micromirror scanner is located. Circle 54 of shot pattern 13 could result, for example, in conical enveloping surface 54', which has a lesser slope than conical enveloping surface 55' that results from circle 55 of shot pattern 13. In order to scan the flat conical enveloping surface 53', for example, black areas or pixels could be provided along edges of shot pattern 13 as shown in FIG. 5A. It is thereby possible, for example, to implement functions of presently usual multi-plane laser scanners by suitable adaptation S06 of shot pattern 13. Stored shot pattern sequences can also be defined successively, e.g., in the form of a sequence of images similar to a repeating movie.

Shot patterns 13 implemented as images could also contain further information. For example, a desired intensity of light beams 20 generated by light source 10 could be encoded via grayscale values in shot pattern 13 implemented as an image. For example, a black area 40, 42 in shot pattern 13 can denote the maximum radiation power level that can be generated by light source 10, whereas regions of shot pattern 13 colored in shades of gray can denote a radiation power level of the generated light beams 20 which is reduced in proportion to the black component in the corresponding gray values. It is also conceivable to use colored images as shot patterns 13, i.e. images having separate RGB channels. A desired beam bundling, for example, i.e. a beam shape of light beams 20 that is wide or narrow in a desired fashion, can be generated via the RGB channel that is used. Each RGB channel can, for example, encode control application signals for a respectively separate laser diode of light source 10.

The use of images as shot patterns makes it possible to install in or on the micromirror scanner special electronic elements (for example, ASICs) that are embodied for image processing, for example for projection purposes. The result is to reduce the number of electronic components to be specially manufactured.

Figure 6A:
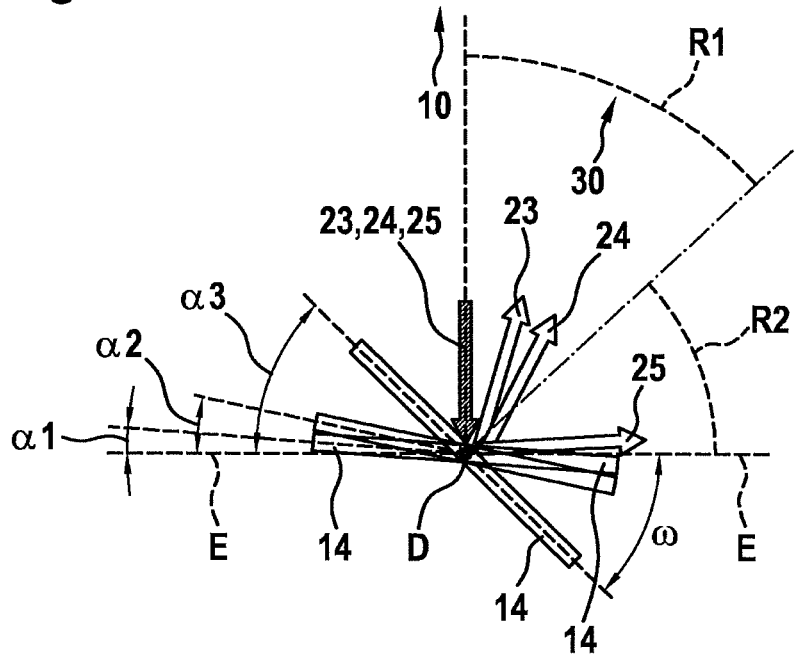
FIGS. 6A to 6C are schematic diagrams to explain various possible properties of the light beams generated in accordance with the shot pattern.
Figure 6B:
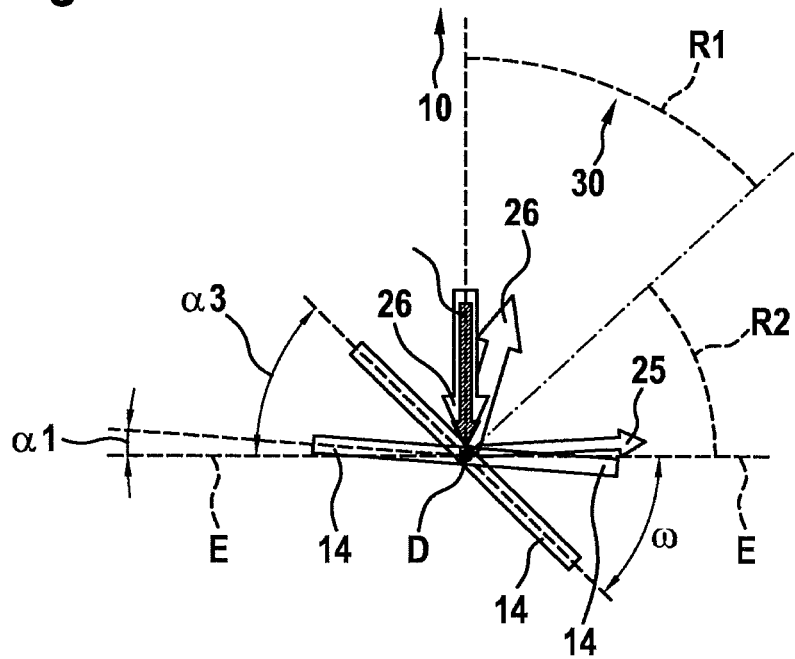
Figure 6C:
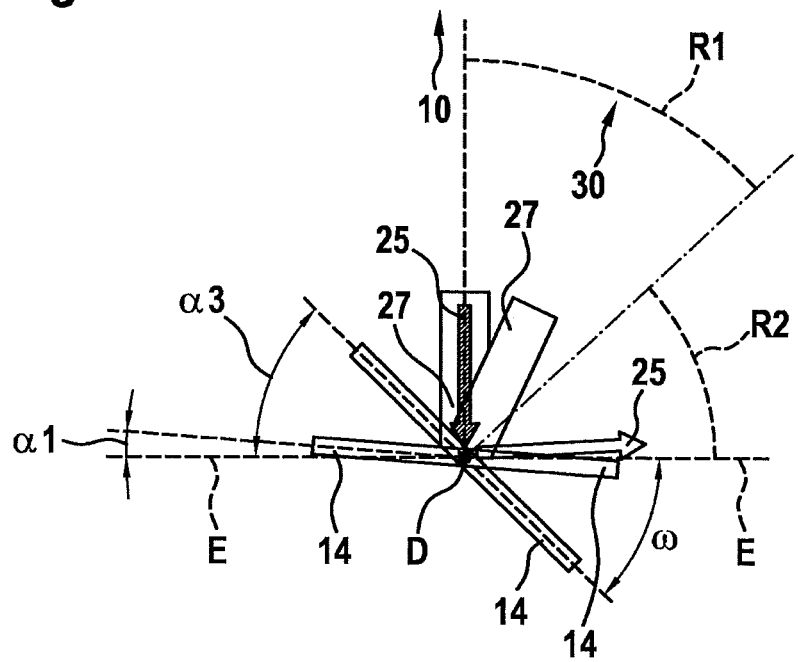

FIGS. 6A to 6C are schematic diagrams to explain possible properties of light beams 20 generated in accordance with shot pattern 13. In FIGS. 6A to 6C, light beams 20 that are generated are always incident perpendicularly from above, coming from light source 10.

FIG. 6A schematically depicts a reflective surface of micromechanical mirror 14 in three different mirror positions that are respectively characterized by a deflection angle $\alpha 1$, $\alpha 2$, $\alpha 3$ out of a reference plane E around a rotation axis D. The difference between $\alpha 2$ and $\alpha 1$ is less than half the difference between $\alpha 3$ and $\alpha 2$ and between $\alpha 3$ and $\alpha 1$. For each of the mirror positions $\alpha 1$, $\alpha 2$, $\alpha 3$ depicted, a light beam 23, 24, 25 is generated by light source 10 in accordance with shot pattern 13 assumed for FIG. 6A, and is deflected in accordance with mirror position $\alpha 1$, $\alpha 2$, $\alpha 3$ of mirror 14. In this example mirror 14 is intended to move at a constant rotational speed w around rotation axis D. Mirror positions $\alpha 1$, $\alpha 2$, $\alpha 3$ that are shown are thus traveled through in succession in continuously connected fashion. A first light beam 23 that is deflected at mirror position $\alpha 1$, and a second light beam 24 that is deflected at mirror position $\alpha 2$, respectively scan a solid angle in a first solid angle region R1. A third light beam 25 that is deflected by mirror 14 in mirror position $\alpha 3$ scans a solid angle in a second solid angle region R2 that is the same size as first solid angle region R1.

A first time interval between the generation of first light beam 23 and the generation of second light beam 24 is shorter than a second time interval between the generation of second light beam 24 and the generation of third light beam 25. Thanks to the shot pattern that is adapted in such a way that scanning in accordance with FIG. 6A is carried out, first solid angle region R1 is thus scanned at a denser scan rate, i.e., with higher resolution, because of the faster sequence of light beams 23, 24 at a constant rotational speed w. Second solid angle region R2 is correspondingly scanned less densely, i.e., with a regionally lower resolution. This can be advantageous, for example, if an object 30 that is to be scanned more finely has been identified in first solid angle region R1 while at the same time no such object is present in second solid angle region R2, and the thermal load is intended to remain approximately the same on average.

FIG. 6B shows not only mirror 14 in mirror position $\alpha 3$ in which third light beam 25 is deflected, but also mirror 14 in mirror position $\alpha 1$ in which a fourth light beam 26 is deflected for scanning a solid angle within first solid angle region R1. For the example shown in FIG. 6B, shot pattern 13 is embodied in such a way that at mirror position $\alpha 1$, fourth light beam 26 is generated by light source 10 with a higher radiation power level than third light beam 25. Fourth light beam 26 having the higher radiation power level can make it possible to determine S05 objects 30 within solid angle region R1 at a greater distance from the micromirror scanner.

FIG. 6C shows micromechanical mirror 14 in the same two mirror positions $\alpha 1$, $\alpha 3$ as in FIG. 6B. Unlike in FIG. 6B, according to FIG. 6C when mirror 14 is in mirror position $\alpha 1$, a fifth light beam 27 is generated by light source 10 and is deflected by micromechanical mirror 14 in order to scan a solid angle in first solid angle region R1. In accordance with shot pattern 13 assumed as an example for FIG. 6C, fifth light beam 27 is generated, as compared with third light beam 25, with the same radiation power level but with a wider beam shape, i.e. a lower light intensity. The wider beam shape of fifth light beam 27 can be implemented, for example, by the fact that fifth light beam 27 is generated in a less-focused manner by light source 10.

Alternatively, provision can also be made that multiple light-generating diodes within light source 10, which are disposed in offset fashion, together generate fifth light beam 27. Thanks to the scanning of solid angles with light beams such as fifth light beam 27 having a wider beam shape, larger portions of solid angle regions R1, R2 can be scanned, using the same total radiation power level, than when light beams such as third light beam 25, having a narrower beam shape, are used. At the same time, the thermal load on light source 10 and on mirror 14 can therefore be kept low.

Although the present invention has been described above on the basis of preferred exemplifying embodiments, it is not limited thereto but is instead modifiable in many ways. In particular, the present invention can be changed or modified in a multitude of ways without deviating from the essence of the present invention.

For example, light beam 22 entering the micromirror scanner can also be coupled in via a separate input and/or can not be guided via micromechanical mirror 14 and/or via beam splitter 12, if the latter is present.

What is claimed is:

1. A method for controlling a micromirror scanner, comprising the following method steps:
    obtaining an image of a first pattern of points;
    performing an image processing of the obtained image to identify the points of the image;
    analyze the identified points of the image to extract instructions regarding control of a light source of the microscanner as a function of mirror positions of a displaceable micromechanical mirror of the micromirror scanner;
    determining a current mirror position of the micromechanical mirror;
    based on the determined current mirror position of the micromechanical mirror and the instructions extracted by the analysis of the identified points, controlling the light source to emit ting light beams to the micromechanical mirror in a manner by which the light beams are deflected by the micromechanical mirror into a solid angle;
    using a light sensor of the micromirror scanner, measuring light beams reflected by an object in the solid angle;
    determining information about the object based on the measured light beams;
    based on the determined information about the object, obtaining an image of a second pattern of points that is different than the first pattern of points; and
    controlling the light source based on the obtained image of the second pattern of points.

2. The method as recited in claim 1, further comprising:
    controlling the displaceable micromechanical mirror to cyclically travel through a defined sequence of mirror positions, wherein the determination of the current mirror position is based on the control of the mirror to cyclically travel through the defined sequence of mirror positions.

3. The method as recited in claim 2, further comprising, during operation of the micromirror scanner, modifying the defined sequence of mirror positions through which the displaceable micromechanical mirror is controlled to cyclically travel based on signals of an external sensor, a user input, or both the signals of the external sensor and the user input.

4. The method as recited in claim 1, further comprising, based on signals of an external sensor, a user input, or both the signals of the external sensor and the user input, obtaining an image of a third pattern of points during operation of the micromirror scanner.

5. The method as recited in claim 1, wherein the first pattern of points defines a first plurality of the light beams to be generated as a function of first mirror positions that are traveled through successively in a continuously connected fashion, the light beams of the first plurality being separated from one another in time by first identical time intervals.

6. The method as recited in claim 5, wherein the second pattern of points defines a second plurality of the light beams to be generated as a function of the mirror positions that are traveled through successively in the continuously connected fashion, the light beams of the second plurality being separated from one another in time by second identical time intervals that are shorter or longer than the first identical time intervals.

7. The method as recited in claim 5, wherein the second pattern of points defines a second plurality of the light beams to be generated (a) as a function of the mirror positions that are traveled through successively in the continuously connected fashion, and (b) with a wider or narrower beam shape than the light beams of the first plurality of the light beams.

8. The method as recited in claim 5, wherein the second pattern of points defines a second plurality of the light beams to be generated (a) as a function of the mirror positions that are traveled through successively in the continuously connected fashion, and (b) with a higher or a lower radiation power level than the light beams of the first plurality of the light beams.

9. The method as recited in claim 1, wherein the determining of the information about the object includes:
    determining, based on the measured light beams, a distance between the object and the micromirror scanner; and
    determining, based on the determined distance and the determined current mirror position of the micromechanical mirror, a position of the object relative to the microscanner, a characteristic of the object, or both the position and the characteristic of the object, based on which the image of the second pattern of points is obtained.

10. The method as recited in claim 1, wherein the analysis includes identifying intervals between output of light beams by the light source based on a spacing between the points of the first pattern of points.

11. The method as recited in claim 1, wherein the analysis includes identifying respective powers at which respective ones of the light beams are to be emitted by the light source based on respective shadings of respective ones of the points of the first pattern, which each corresponds to a respective one of the light beams.

12. The method as recited in claim 1, wherein the analysis includes identifying respective beam shapes of respective ones of the light beams to be emitted by the light source based on respective colors of respective ones of the first pattern, which each corresponds to a respective one of the light beams.

13. A micromirror scanner comprising:
    a displaceable micromechanical mirror;
    a light source;
    a light sensor; and
    processing circuitry;
    wherein the processing circuitry is configured to:
        obtain an image of a first pattern of points;
        perform an image processing of the obtained image to identify the points of the image;
        analyze the identified points of the image to extract instructions regarding control of the light source as a function of mirror positions of the mirror;
        based on a current position of the mirror and the extracted instructions, control the light source to emit light beams to the mirror in a manner by which the light beams are deflected by the mirror into a solid angle;
        based on output of the light sensor, measure light beams reflected by an object in the solid angle;
        determine information about the object based on the measured light beams;
        based on the determined information about the object, obtain an image of a second pattern of points that is different than the first pattern of points; and
        control the light source based on the obtained image of the second pattern of points.

14. The micromirror scanner as recited in claim 13, wherein the processing circuitry includes an image processor ASIC configured to perform the image processing.

* * * * *